Dec. 9, 1958   T. THORLEY ET AL   2,863,982
ARC WELDING
Filed July 31, 1956

INVENTORS:
Thomas Thorley,
Raymond Robinson,
BY Cushman, Darby & Cushman
ATTORNEYS.

2,863,982
Patented Dec. 9, 1958

2,863,982

ARC WELDING

Thomas Thorley, Coventry, and Raymond Robinson, Sutton Coldfield, England, assignors to Imperial Chemical Industries Limited, London, England, a corporation of Great Britain Application July 31, 1956, Serial No. 601,169

Claims priority, application Great Britain August 4, 1955

11 Claims. (Cl. 219—74)

This invention relates to a method of arc welding metals and more particularly to a method of inert gas shielding and cooling welded joints in reactive metals such as titanium.

When welding thin gauge metal it is desirable to dissipate heat from the vicinity of the weld as quickly as possible in order to minimise distortion, and it is usual to employ metal chills for this purpose. Also when certain reactive metals such as titanium are welded, it is essential that during the operation the metal should be shielded from the atmosphere to prevent absorption by the molten weld metal of oxygen and nitrogen which would adversely affect the mechanical properties of the completed joint. Customarily this is achieved by the use of an inert gas, such as argon, to protect the molten weld metal and any adjacent solid metal which may be at a temperature exceeding that at which contamination occurs. In order to cool the weld metal quickly below that temperature it is the practice to use steel clamping bars or chills, usually of the order of ½" thick, which securely clamp the pieces to be welded against a steel backing plate provided with a means for obtaining argon protection at the back surface of the welded joint. Whilst satisfactory welds can be produced by this means it has been found that the chills are liable to induce turbulence in the argon protective stream and so entrain air which may cause weld contamination.

The use of extended fins or shrouds not less than 1¼" high, forming extensions of the inner edges of the chills, has been found to give improved results and enables bright welds of low contamination level to be produced relatively easily providing that positive and uniform clamping of the pieces to be welded is ensured. This offers no difficulty where the parts are straight flat pieces, but if complicated shapes are involved the cost of machining the necessary chills and back supports may be prohibitive.

The object of the present invention is to provide a method of overcoming these difficulties in a simple and effective manner.

According to the present invention, we provide a method of arc welding in which the joint being welded is chilled by means of thin, ductile, fluid-cooled metal chills shaped to make close contact with the surface of the parts being joined adjacent to the weld.

According to a further feature of the invention, we provide a method of arc welding reactive metals and alloys in an inert atmosphere in which the joint being welded is chilled by means of thin, ductile, fluid-cooled metal chills shaped to make close contact with the surface of the parts being joined adjacent to the weld, the inert atmosphere being maintained by gas shrouds on the chills, and by backing strips which are shaped to make close contact with the surface of the parts at the back of the joint.

The chills and shrouds are preferably made from a metal of high conductivity such as copper or aluminium, in the annealed or softened condition.

The principle of the method is to shape the chills from sheet metal by relatively simple methods, such as bending and hammering to the contours of the workpiece, the edges of the chills being made parallel to the joint to be welded. To the chills metal strips are attached by brazing or other means, perpendicularly or at a small angle from the perpendicular, parallel and close to the edges of the chills, to form gas shrouds, and at least one tube for conveying cooling fluid is affixed to each chill. When a pair of chills and attached shrouds are clamped in position on either side of the joint, there is formed between the two shrouds and the joint a channel into which the argon issuing from the torch is directed. To protect the back of the weld from oxidation, a backing strip made from a suitably shaped piece of thin gauge soft metal, e. g. copper foil, and incorporating means for maintaining a continuous supply of argon at the back of the weld, is sealed to the back of the joint with adhesive tape.

The operation of forming the chills to the shape of the workpiece is not difficult. Ordinary sheet metalworking methods may be used or where the parts to be welded have been pressed into shape, the chill may be chaped in the same dies. Final adjustments to ensure good contact between chill and workpiece may be made in situ, for example, by judicious hammer-peening. The chills are kept in position and in close contact by lightly clamping or by wedging, depending upon the shape of the workpiece.

One embodiment of our invention is illustrated by way of example in the accompanying drawings of which:

Figure 1:
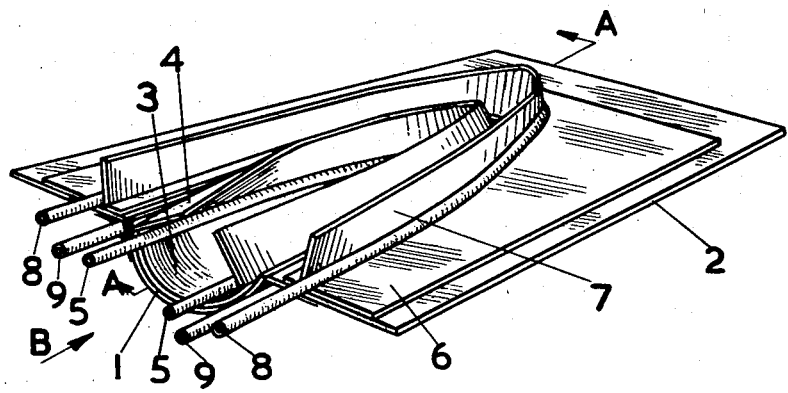
Figure 1 is a perspective view of chills and shrouds made according to the invention as applied to the welding of an oblique section of a half tube into a corresponding cut-out in a flat sheet.
Figure 2:
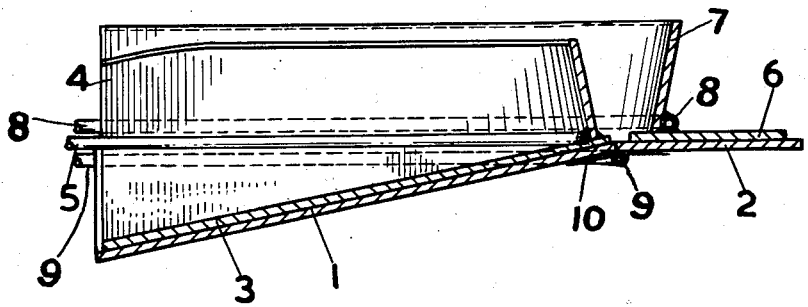
Figure 2 is a sectional view along the line A—A of Figure. 1.
Figure 3:
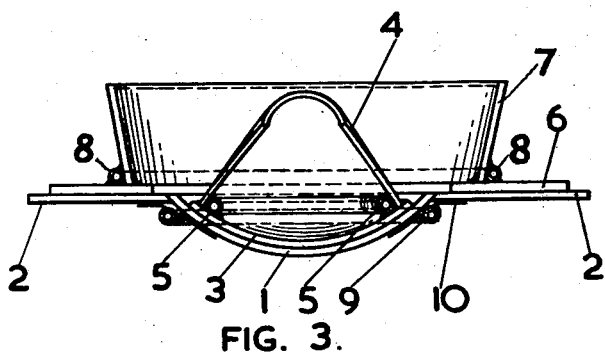
Figure 3 is an elevational view of the arrangement in Figure 1, in the direction of the arrow B.

Referring to the drawings, the parts to be welded comprise an olique section of a half tube 1 and a flat sheet 2, part of which has been cut out to receive the part 1. A chill 3 for the oblique section 1 is made by bending an annealed sheet of copper 1/16" thick to the inner radius of the oblique section 1, the edges of the said sheet being cut so as to be approximately parallel to and about ¼" from the edges of the oblique section 1. To the concave side of the chill 3, about 5/16" from and parallel to the edges, is attached by brazing, a length of copper strip 4, not less than 1¼" wide. A copper tube 5 is then brazed to the chill at the base of and behind strip 4.

In a similar manner a chill 6 for the sheet 2 is made, the strip 7 being set back about 5/16" from that edge of the chill 6 which is parallel to the profile of part 1 cut in the sheet 2. A copper cooling water pipe 8 is brazed to the sheet 2 at the base of strip 7.

The relative positions of strips 4 and 7 which form gas shrouds are important. The distance between the top edges should be such as to permit entry of the end of the welding torch with the electrode located squarely above the joint to be welded, whilst the distance between the lower, brazed edges should be smaller than that between the top edges. It is desirable that the shrouds should be kept as close to each other as possible without impeding manipulation of the torch.

To carry out the welding operation, the oblique section 1 is placed in its correct position within the sheet 2, tacking if necessary, and a copper tube 9, shaped to follow the line of the weld, is placed behind the joint and fixed in position by covering first with copper foil 10 and then sealing the edges of the foil to the sheet 2 with adhesive tape. The copper tube 9, which may be closed at one end conveys argon which is distributed at the back of the weld through perforations provided in the walls of the tube. A water supply is connected to the tubes 5 and 8 to provide cooling for the chills 4 and 7, which are placed in their respective positions on either side of the joint. A close fit between the edges of the chills and the workpieces is achieved by hammer-peening the edges where necessary. The chills are held in position by suitable clamps. Welding then proceeds in the customary manner using low speeds of flow of argon from a large size nozzle.

In an alternative method of providing argon protection for the back of the weld a sheet of copper foil is shaped to fit the back of the assembled joint and argon delivered to the weld area through holes drilled through the foil into an argon pipe brazed to the back of the foil.

Chills and shrouds made according to the invention provide a means of obtaining bright, uncontaminated welds in titanium fabrications of either simple or complex shapes. They have the merit of being considerably easier and cheaper to make than massive steel chills, which require a number of machining operations, since the improved chills can largely be made with simple hand tools. Furthermore, such chills are sufficiently robust to be used for welding a large number of fabrications.

We claim:

1. A method of arc welding reactive metals and alloys in an inert atmosphere in which the joint being welded is chilled by means of thin, ductile, fluid-cooled metal chills, shaped to make close contact with the surface of the parts being joined adjacent to the weld, the inert atmosphere being maintained by gas shrouds on the chills, and by ductile backing strips which are shaped to make close contact with the surface of the parts at the back of the joint.

2. A method of arc welding, as claimed in claim 1, in which the ductile metal backing strip is provided with means for maintaining a supply of inert gas to the back of the joint being welded, comprising a metal tube with perforated walls located between the backing strip and the joint being welded.

3. A method of arc welding, as claimed in claim 1, in which the ductile metal backing strip is provided with a means for maintaining a supply of inert gas to the back of the joint being welded, comprising a metal tube attached to the backing strip, and having perforations through the tube walls and the backing strip for the passage of the gas.

4. A method of arc welding, as claimed in claim 1, in which fluid cooling of the chills is carried out by means of metal tubes attached thereto.

5. A chill for cooling joints being arc welded, comprising a ductile metal strip deformable to the shape of the part to be welded adjacent to the joint, having attached to it a metal tube for conveying cooling fluid.

6. A combined chill and gas shroud for arc welding, comprising a thin, ductile metal strip, deformable to the shape of the part to be welded adjacent to the joint, and having a fin extending substantially the length of the ductile metal strip, together with a metal tube attached to and extending the length of the ductile metal strip, for conveying cooling fluid.

7. A combined chill and gas shroud, as claimed in claim 6, in which the ductile metal strip is copper.

8. A combined chill and gas shroud, as claimed in claim 6, in which the ductile metal strip is aluminium.

9. A backing strip for arc welding, comprising a ductile metal strip deformable to the shape of the joint, provided with means for supplying inert gas to the back of the weld.

10. A backing strip, as claimed in claim 9 in which the means for supplying inert gas comprises a metal tube with perforated walls.

11. A backing strip, as claimed in claim 9, in which the means for supplying inert gas comprises a metal tube attached to the backing strip and having perforations through the tube walls and the backing strip for the passage of the gas.

References Cited in the file of this patent
UNITED STATES PATENTS

| | | |
|---|---|---|
| 1,553,543 | Lincoln | Sept. 15, 1925 |
| 1,746,209 | Alexander | Feb. 4, 1930 |
| 2,357,170 | Burggraf | Aug. 29, 1944 |
| 2,644,070 | Herbst | June 30, 1953 |